United States Patent [19]

Tsunashima

[11] Patent Number: 4,799,114

[45] Date of Patent: Jan. 17, 1989

[54] THERMOMAGNETIC RECORDING CARRIER AND A METHOD FOR THERMOMAGNETIC RECORDING

[75] Inventor: Shigeru Tsunashima, Nagoya, Japan

[73] Assignees: Daidotokushuko Kabushiki Kaisha; Canon Kabushiki Kaisha, both of Japan

[21] Appl. No.: 51,163

[22] Filed: May 15, 1987

Related U.S. Application Data

[63] Continuation of Ser. No. 908,934, Sep. 15, 1986, abandoned, which is a continuation of Ser. No. 644,143, Aug. 24, 1984, abandoned, which is a continuation-in-part of Ser. No. 315,467, Oct. 27, 1981, abandoned.

[30] Foreign Application Priority Data

Nov. 1, 1980 [JP] Japan .............................. 55-154291

[51] Int. Cl.$^4$ .............................................. G11B 5/02
[52] U.S. Cl. ..................................... 360/59; 360/135
[58] Field of Search ......................................... 360/59

[56] References Cited

U.S. PATENT DOCUMENTS

| | | | |
|---|---|---|---|
| 3,394,360 | 7/1968 | Miyara | 360/114 |
| 3,701,133 | 10/1972 | Smaller et al. | 360/114 |
| 3,949,387 | 4/1976 | Chaudhari et al. | 340/174 |
| 4,152,486 | 5/1979 | Imamura et al. | 428/606 |
| 4,202,022 | 5/1980 | Imamura et al. | 360/114 |
| 4,293,621 | 10/1981 | Togami | 428/678 |
| 4,340,914 | 7/1982 | Hanaoka | 360/59 |
| 4,347,112 | 8/1982 | Togami | 204/192 |
| 4,351,010 | 9/1982 | Arai | 360/134 |

FOREIGN PATENT DOCUMENTS

| | | |
|---|---|---|
| 2163607 | 11/1975 | Fed. Rep. of Germany . |
| 1578005 | 8/1969 | France . |
| 31703 | 3/1977 | Japan . |
| 24008 | 2/1979 | Japan . |
| 12244 | 9/1980 | Japan . |
| 105344 | 8/1982 | Japan . |
| 1390563 | 4/1975 | United Kingdom . |
| 2077065 | 2/1980 | United Kingdom . |
| 2071696 | 9/1981 | United Kingdom . |

OTHER PUBLICATIONS

"Beam Addressable High-Density Magnetic Record File" by G. H. May, JBM TDB vol. 16 #7, 12/73.

S. Tsunashima, H. Tsumi, T. Kobayashi and S. Uchiyama, "Thermomagnetic Writing on Multilayered Amorphous Rare-Earth Iron Films", J. Magnetics Soc'y. Japan, vol. 5, No. 2, 1981.

T. Kobayashi, H. Tsuji, S. Tsunashima and S. Uchiyama, "Magnetization Process of Exchange-Coupled Ferrimagnetic Double-Layered Films", Japanese J. Applied Physics, vol. 20, No. 11, Nov. 1981.

S. Tsunashima, H. Tsuji, T. Kobayashi and S. Uchiyama, "Thermomagnetic Writing on Exchange-Coupled Amorphous Rare-Earth Iron Double-Layer Films", IEEE Transactions on Magnetics, vol. MAG-17. No. 6, Nov. 1981.

A. Nodo, T. Kobayashi, S. Tsunashima and S. Uchiyama, "Thermomagnetic Writing and Erasing Characteristics of Exchange-Coupled Amorphous Rare-Earth Iron Double-Layered Film", J. Magnetics Soc'y. Japan, vol. 6, No. 2, 1982.

Y. Togami, "Stability of Small Bits Written in Amorphous Gd-Co Thin Films" Appl. Phys. Lett. vol. 32, No. 10, May 15, 1978.

W. H. Meiklejohn, "New Magnetic Anisotropy", Physical Review, vol. 102, No. 5, Jun. 1, 1956 pp. 1413, 1414.

H. Uchishiba, H. Tominaga, T. Namikata and S. Sakai, "Internal Bias Effect of Double Layer Epitaxial Garnet Films", IEEE Transactions on Magnetics, vol. MAG-9, No. 3, Sep. 1973.

(List continued on next page.)

Primary Examiner—Vincent P. Canney
Attorney, Agent, or Firm—Fitzpatrick, Cella, Harper & Scinto

[57] ABSTRACT

A new thermomagnetic recording medium is presented. The medium comprises a substrate and a pair of layers, one of which is comprised essentially of Gd-alloys. A layer wherein Gd-alloys is used exchange couples with another layer having higher coercive force, where both layers possess perpendicular anisotropy, and different Curie Points. The medium possesses a high Signal/Noise ratio, and maintains information stored therein for long periods of time.

8 Claims, 2 Drawing Sheets

OTHER PUBLICATIONS

K. Y. Ahn and G. S. Almasi, "Coupling Effects Between Films of Fe and EuO" IEEE Transactions on Magnetics, vol. MAG-5, No. 4, Dec. 1969.

O. Massenet, "Coupling in Multilayered Magnetic Films", IEEE Transactions on Magnetics, vol. MAG-4, No. 1, Mar. 1968.

W. P. Lee and D. A. Thompson, "An Exchange-Coupled Thin-Film Memory Device", IEEE Transactions on Magnetics, vol. MAG-4, No. 3, Sep. 1968.

J. C. Bruyere and O. Massenet, "Application of Coupled Films to Memory Elements" IEEE Transactions ON Magnetics, vol. 5, No. 3, Sep. 1969.

G. S. Almasi and E. R. Genovese, "Nonvolatile Magneto-Optical Memory Element", IBM Technical Disclosure Bulletin vol. 14, No. 1, Jun. 1971, p . 342.

H. Tsujimoto, D. P. Shen, S. Matsushita and Y. Sakurai, "Magnetic Properties of Multilayered Amorphous Magnetic Films", IEEE Transaction on Magnetics, vol. MAG-16, No. 5, Sep. 1980, pp. 1209-1211.

R. C. Taylor and A. Gangulee "Magnetic Anisotropy in Evaporated Amorphous Films of the Ternary System $Gd_x(Fe_{1-y}Co_y)1-x$", J. Applied Physics vol. 48, No. 1, Jan. 1977, pp. 358-361.

A. M. Balbashov, N. D. Baikova, A. P. Gubarev, S. N. Marchenko, A. Ya. Chervonenkis, and A. A. Shimko "Thermomagnetic Recording in a Structure Consisting of a Film of a Garnet Containing Bi and MnBi Film", Soviet Technical Physics Letters 3 (12), Dec. 1977, pp. 529-530.

A. M. Balbashov, A. P. Gubarev and A. Ya. Ghervonenkis "Thermomagnetic Recording in Two-Layer Magnetic Structure" Soviet Technical Physics Letters 49, No. 11, Nov. 1979, pp. 1349-1350.

O. S. Lutes, J. O. Holmen, R. L. Kooyer and O. S. Aadland, "Inverted and Biased Loops in Amorphous Gd-Co Films", IEEE Transactions on Magnetic vol. MAG-13, No. 5, Sep. 1977, pp. 1615-1617.

M. Amatsu, S. Honda and T. Kusuda, "Anamalous Hysteresis Loops and Domain Observation in Gd-Fe Co-Evaporated Films", IEEE Transactions on Magnetics vol. MAG-13, No. 5, Sep. 1977, 1612-1614.

Sotaro Esho "Anomalous Magneto-Optical Hysteresis Loops of Sputtered Gd-Co Films", Japanese J. Applied Physics (Supplement) vol. 15, 1976, pp. 93-98.

Y. Mimura, N. Imamura, T. Kobayshi, A. Okada and Y . Kushiro "Magnetic Properties of Amorphous Alloy Films" of Fe with Gd, Tb, Dy, Ho, or Er, J. Applied Physics, vol. 49, No. 3, Mar. 1978, pp. 1208-1214.

Y. Mimura, N. Imamura and T. Kobayashi, "Kerr Readout Characteristics of Gd-Fe, Tb-Fe and Dy-Fe Amorphous Alloy Films" Japanese J. Applied Physics, vol. 17, No. 11, Nov. 1978, pp. 2007-2012.

M. J. Freiser, "A Survey of Magneto-Optic Effects", IEEE Transactions on Magnetics, vol. MAG-4, No. 2, Jun. 1968, pp. 152-161.

THERMOMAGNETIC RECORDING CARRIER AND A METHOD FOR THERMOMAGNETIC RECORDING

This application is a continuation of application Ser. No. 908,934 filed Sept. 15, 1986 which in turn is a continuation of application Ser. No. 644,143, filed Aug. 24, 1984 which in turn is a continuation-in-part of application Ser. No. 315,467 filed Oct. 27, 1981, all of which are now abandoned.

BACKGROUND OF THE INVENTION

1. Field of the Invention

The instant invention relates to a new magneto-optically readable recording medium and a new method of thermomagnetic recording. More particularly, the instant invention relates to a new magneto-optically readable recording medium consisting of a substrate and a first and second layer, said layers possessing perpendicular magnetic anisotropy and can be easily magnetized perpendicular to the layer plane, said first layer possessing higher coercive force and lower Curie point relative to said second layer, said second layer comprised essentially of Gd alloys, and said first and second layers exchange coupling with each other. Further the instant invention relates to a new method of thermomagnetic recording employing said magneto-optically readable recording medium consisting of performing writing of information by heating said medium at approximate Curie point of said higher coercive force layer as the first layer by employing converged laser light.

2. Description of the Prior Art

Hitherto, magneto-optically readable recording media for been provided, which consist of a substrate made of non-magnetic material, such as glass, ceramics, plastics and the like, and a recording layer made of a metallic magnetic material, such as an alloy comprising two or more metals e.g. iron, cobalt, chromium, manganese, gadolinium, terbium, bismuth and the like, or metallic oxide e.g. iron oxide, rare-earth metal-iron garnet and the like. In said magneto-optically readable recording media laser light is applied to the surface of the recording layer to heat the respective applied part of the surface at approximately its Curie point or to more than the compensation point and a bias magnetic field is applied to said heated part to cause the magnetization of said heated part to become oriented in the opposite direction to another part. In this way the writing of information is performed. In addition, another linear polarized laser light is applied to the surface of the recording layer in which information is recorded and the reflecting light from the surface is optically detected by using the photo-detector. Thus, the readout of recorded information is performed.

The recording layer of the above-mentioned magneto-optically readable recording medium consists of a layer of a metallic magnetic material. Gadolinium alloys (Gd alloys) may be preferable as said metallic magnetic material since Gd alloys give said recording medium an excellent SN ratio. Gd alloys, however, possess one disadvantage, namely said recording medium consisting of Gd alloys has low coercive force and therefore the information written in the recording medium is unstable.

Accordingly, an object of the instant invention is to improve said fault of the recording layer consisting of Gd alloys.

Said object of the instant invention can be attained by exchange-coupling a metallic magnetic material layer having higher coercive force with the Gd alloys layer.

1. In case of writing at approximately the Curie point, the material having a lower Curie point must be used as the recording layer since it is difficult to heat the recording layer at high temperature when the laser is miniaturized to reduce the writing power, or when the writing speed (Bit Rate) is increased. However in case of low Curie point materials, the signal of the readout may be low since the oriented magnetization is apt to become disoriented even at usual temperature.

Further, the intensity of light must be limited to lower than a certain value. This is because the recorded information is erased by a significant increase of the temperature of the applied recording medium surface when the intensity of light applied to the surface of the recording layer is increased during readout. Consequently the S/N ratio (Signal/Noise Ratio) may be small when such small intensity of light is used since the S/N ratio is proportional to the square root of the intensity of light. The S/N ratio may be reduced by above-mentioned two factors.

2. In case of writing at more than the approximate compensation point, a large margin in the composition of the recording medium is not permissible since the range of the composition of the recording medium must be limited to obtain a high coercive force. This in turn requires strictness regarding the composition of the recording medium and causes trouble in the preparation process thereof. Further, the recorded information is apt to be affected by the external magnetic field and temperature; and the recording density is also reduced.

SUMMARY OF THE INVENTION

Accordingly, it is an object of the instant invention to provide a magneto-optically readable recording medium in which the S/N ratio is not reduced in spite of decreased writing in power.

A further object of the instant invention is to provide a magneto-optically readable recording medium in which high coercive force is guaranteed over a wide range of temperature and composition of the recording medium.

A still further object of the instant invention is to provide a magneto-optically readable recording medium in which the recorded information is stable against external magnetic fields.

Briefly, these objects of the instant invention can be attained by a new magneto-optically readable recording medium consisting of a higher coercive force layer positioned on the surface of a substrate, which can be magnetized perpendicular to the layer plane and has some lower Curie point; and a lower coercive force layer positioned on the higher coercive force layer surface and has some higher Curie point; wherein said higher coercive force layer and said lower coercive force layer are exchange-coupled. These objects are also obtained by a new method of thermo-magnetic recording consisting of performing writing of information by heating said higher coercive force layer at approximately its Curie point by employing converged laser light.

BRIEF DESCRIPTION OF THE DRAWINGS

FIGS. 4 and 5 show plots of these relationships for Gd—Fe layers as (●---●) and for Tb—Fe layers as (○---○).

DETAILED DESCRIPTION

Figure 1:
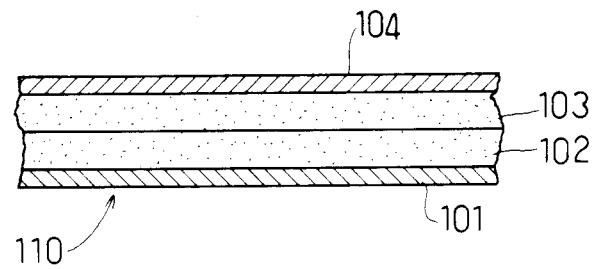
FIG. 1 shows a partial side sectional view of a preferred embodiment of the instant invention.

Referring now to FIG. 1, a recording medium 110 consists of a substrate 101, a higher coercive force layer 102 formed on a surface of said substrate 101, a lower coercive force layer 103 formed on a surface of said higher coercive force layer 102 and a transparent protecting layer 104 covering the surface of said lower coercive force layer 103. Said substrate 101 is made of a non-magnetic material such as glass, ceramics, plastics and the like. Said higher coercive force layer 102 and said lower coercive force layer 103 are, respectively, made of an alloy consisting of two or more metals such as transition metal e.g. iron, cobalt, chromium, nickel and the like, lanthanide metal e.g. gadolinium, terbium, dysprosium and the like, antimony metal e.g. antimony, bismuth and the like, etc. Said higher coercive force layer 102 possesses perpendicular magnetic anisotropy and has lower Curie point desirably 200° C. to 50° C., more desirably 150° C. to 100° C., while said lower coercive force layer 103 has a Curie point desirably more than 200° C. Further, said alloys making up material of said layers 102 and 103 are desirably amorphous or single crystal or fine poly-crystal so as to record the information in high density and make S/N ratio high on the readout of the recorded information. Alloys suitable for the higher coercive force layer 102 include amorphous Tb—Fe alloy, amorphous Dy—Fe alloy and the like and alloys suitable for the lower coercive force layer 103 consist of amorphous Gd alloys such as Gd—Fe alloys, amorphous Gd—Co alloys, amorphous Gd—Fe—Co alloys, amorphous Gd—Fe—Co—Bi alloys, amorphous Gd—Fe—Co—Ge alloys, amorphous Gd—Fe—Co—Sn alloys, amorphous Gd—Fe—Co—Al alloys and the like. Said Gd—Fe—Co alloys, Gd—Fe—Co—Bi alloys, Gd—Fe—Co—Ge alloys and Gd—Fe—Co—Sn alloys give the layer 103 an excellent S/N ratio since these alloys increase the angle of Kerr rotation ($O_K$). Further, Gd—Fe—CO—Al alloys give the layer 103 excellent corrosion resistance.

The layers 102 and 103 are formed on the substrate 101 by a conventional method such as vacuum evaporation, sputtering and the like; and the thickness of the layer 102 is more than approximately 100 A and that of the layer 103 is approximately 100 to 500 A, and the domain wall width $\delta w$ of the lower coercive force layer 103 should be equal to or more than the light transmitting thickness $1/\alpha$ of the layer 103 (wherein $\alpha$ is the absorption coefficient of light) in order to allow the higher coercive force layer 102 to exchange-couple with the lower coercive force layer 103. Said transparent protecting layer 104 is made of a transparent non-magnetic material such as silicon oxide, tin oxide, glass and the like and the thickness of the layer 104 is approximately 500 to 5000 A.

Although the higher coercive force layer 102 and the lower coercive force layer 103 are separately formed in above-mentioned embodiment, the layers 102 and 103 may be also formed continuously by varying continuously the composition from the higher coercive force side to the lower coercive force side.

Further the lower coercive force layer 103 may be formed on the substrate 101 and then the higher coercive force layer 102 may be formed on the layer 103 in case that the substrate 101 is transparent.

Any thermomagnetic means can be applied for writing in to the recording medium of the instant invention but the following means may be preferable.

Figure 2:
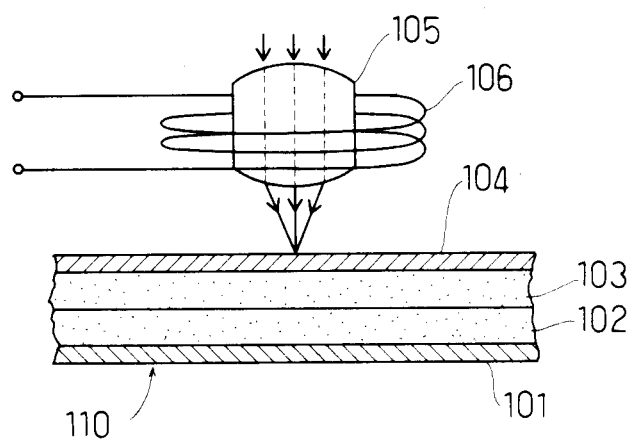
FIG. 2 shows a partial side sectional view of the embodiment of FIG. 1 during writing.

Referring to FIG. 2, near infrared radiation or visible radiation is radiated from a gas laser, a semi-conductor laser or the like at 1 to 100 mW of output and said radiation focuses onto a spot on the surface of the recording medium 110 through an object lens 105 to heat it partially up to approximate Curie point of the higher coercive force layer 102. A bias magnetic field of approximately 50 to 500 Oe is applied on the region including said heated point by a magnetic field generating coil 106 and said heated point of the higher coercive force layer 102 is magnetized in the opposite direction to another part of the layer 102 by said bias magnetic field. Thus the information is written into the lower coercive force layer 103 after the spot of the radiation is removed, and said information is also written in the higher coercive force layer 102 at the same time since the higher coercive force layer 102 and the lower coercive force layer 103 are coupled with each other through the exchange force.

Figure 3:
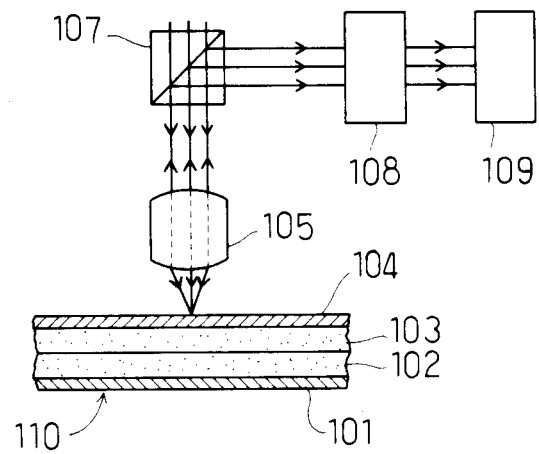
FIG. 3 shows a partial side sectional view of the embodiment of FIG. 1 during reading-out.

Referring to FIG. 3, linear polarized light from another laser is focused onto a spot on the surface of the recording medium 110 by making the light pass through a half mirror 107. The object lens 105 and the reflected light from the surface of the recording medium 110 is received by a photodetector 108 through the object lens 105 and the half mirror 107; and reflected light received by the photo-detector 108 is then detected by a photodiode 109. The polarizing plane of the light reflected from the lower coercive force layer 103 is rotated by Kerr-effect and readout is performed by detecting said rotation of the polarizing plane.

The magneto-optically readable recording medium of the instant invention has advantages as follows:

1. Advantages relating to the higher coercive force layer are the possibility of applying low writing-in power, increasing writing speed (Bit Rate), stabilizing the information written against the external magnetic field and the temperature change, permitting a wide margin of the composition of the recording medium, and further, the possibility of recording in high density, approximately the light-disk range.

2. Advantages relating to the lower coercive force layer are that a high S/N ratio is obtained on the readout since the readout is performed on the lower coercive force layer.

3. Advantages relating to perpendicular magnetic anisotropy of both layers is the possibility of recording in high density, approximately the light-disk range.

EXAMPLE

The recording medium 110 is made of the following material:

Substrate 101: Glass plate, 1 mm thick;

Higher coercive force layer 102: Amorphous Tb—Fe alloy 155 Å thick, approximate 10 KOe of coercive force, and 120° to 130° C. of Curie point.

Lower coercive force layer 103: Amorphous Gd—Fe alloy 300 Å thick, more than 0.5 KOe of coercive force, approximate 36' (6328 Å) of Kerr rotation angle ($\theta$k), and 210° to 220° C. of Curie point.

Transparent protecting layer 104: Silicone oxide.

The layers 102 and 103 are formed by the vacuum evaporation method.

Figure 4:
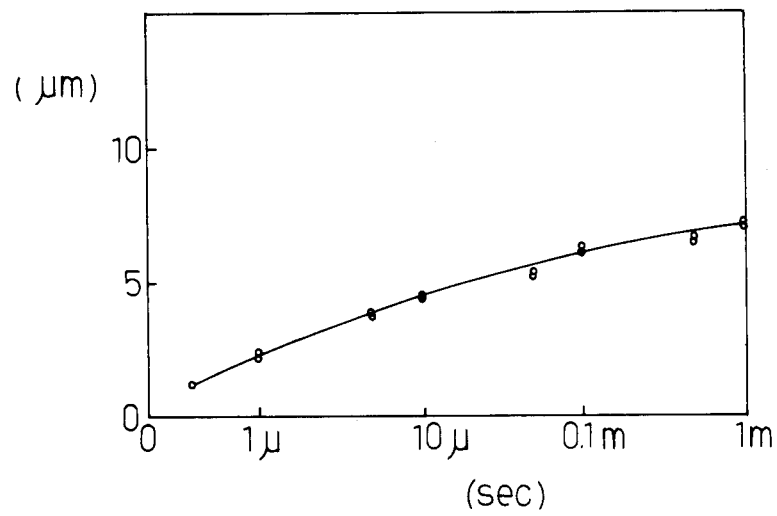
FIG. 4 is a plot showing the relation between the irradiating time of laser light and the recorded Bit diameter of the embodiment of FIG. 1.
Figure 5:
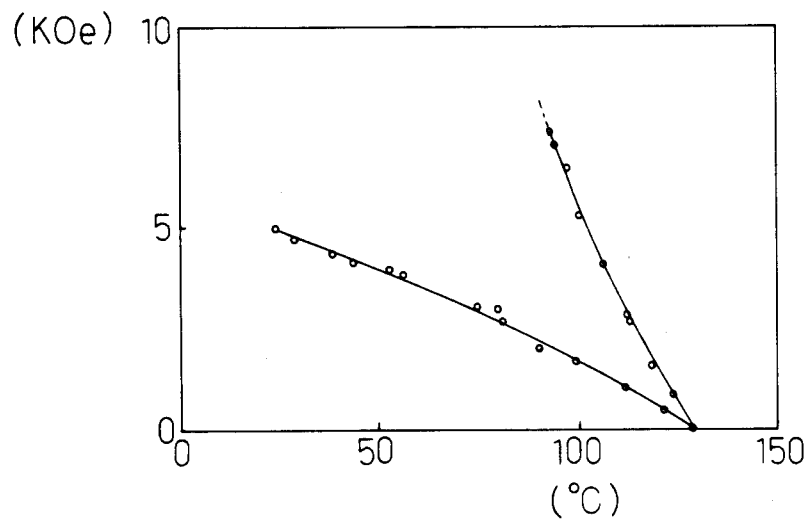
FIG. 5 is a plot showing the relation between the temperature and the external magnetic field when the recorded information is erased of the embodiment of FIG. 1.

The information is written-in said recording medium 110 by using a He—Ne gas-laser having 5 mW power and a bias magnetic field of 100 Oe. Referring to FIG. 4, the longitudinal axis shows Bit diameter ($\mu$m) and the horizontal axis shows the light irradiating time (sec). Bit recording at 2 $\mu$m diameter is performed in 1 $\mu$sec sec of the light irradiating time and Bit recording at 1 $\mu$m; diameter is performed in 0.5 $\mu$sec of light irradiating time. Referring to FIG. 5, the longitudinal axis shows the external magnetic-field (KOe) erasing the recorded information. The horizontal axis shows the temperature (°C.), and the information recorded in the recording medium 110 is stable up to approximately 120° C. under an external magnetic field of 1 KOe.

What is claimed is:

1. A thermomagnetically recordable and magneto-optically readable recording carrier comprising; a substrate; first and second layers being disposed on said substrate, said first layer possessing a higher coercive force and a lower Curie point relative to said second layer, at least said first layer possessing perpendicular magnetic anisotropy; and said first layer and said second layer being formed of amorphous alloys of lanthanide-transition metals, and said first layer and said second layer being exchangeably combined.

2. The recording carrier in accordance with claim 1, wherein the thickness of said second layer is from about 100 Å to 500 Å.

3. The recording carrier in accordance with claim 1, wherein said first layer has a Curie point of from about 50° to 200° C., and said second layer has a Curie point of more than about 200° C.

4. The recording carrier in accordance with claim 1, wherein said first layer has a Curie point of about 100° to 150° C.

5. The recording carrier in accordance with claim 1, wherein a transparent non-magnetic layer is disposed on said second layer.

6. The recording carrier in accordance with claim 1, wherein said first layer is formed of Tb—Fe alloy or Dy—Fe alloy and said second layer being formed of Gd—Fe alloy or Gd—Co alloy.

7. The recording layer in accordance with claim 6, wherein the thickness of said second layer is from about 100 Å to 500 Å.

8. A method for thermomagnetic recording comprising using a magneto-optically readable recording medium in a thermomagnetic recording mechanism, wherein information is supplied to a first layer composed of amorphous alloy of lanthanide-transition metal which possesses a relatively higher coercive force and a lower Curie point and a second layer composed of amorphous alloy of lanthanid-transition metal which possesses a lower coercive force and a higher Curie point relative to said first layer, said first layer and said second layer being exchangeably combined, and at least said first layer possessing perpendicular magnetic anisotropy, said information being supplied by heating said medium by employing converged laser light, and by applying a magnetic field to a portion which is heated by said laser light, said information being readable by radiating laser light to a portion of said recording carrier and detecting the rotation of the polarizing plane of the laser light from the portion to be read, said rotation being produced in accordance with the Kerr effect.

* * * * *